United States Patent [19]
Fischer et al.

[11] Patent Number: 5,647,225
[45] Date of Patent: Jul. 15, 1997

[54] MULTI-MODE HIGH EFFICIENCY AIR CONDITIONING SYSTEM

[76] Inventors: Harry C. Fischer, P.O. Box 338, St. Michaels, Md. 21663; James L. Denkmann, 534 W. Stratford Pl., Chicago, Ill. 60657; Michael W. McRell, 9084 Olentangy River Rd., Powell, Ohio 43065

[21] Appl. No.: 490,224

[22] Filed: Jun. 14, 1995

[51] Int. Cl.$^6$ .............................. F25D 17/02; F25B 39/02
[52] U.S. Cl. .................... 62/434; 62/435; 62/524
[58] Field of Search ..................... 62/430, 434–435, 62/59, 99, 185, 524

[56] References Cited

U.S. PATENT DOCUMENTS

| | | | |
|---|---|---|---|
| 2,185,515 | 1/1940 | Neeson | 62/117 |
| 2,227,244 | 12/1940 | Candor | 62/430 |
| 3,301,002 | 1/1967 | McGrath | 62/185 |
| 3,675,441 | 7/1972 | Perez | 62/434 |
| 3,866,439 | 2/1975 | Bussjager et al. | 62/504 |
| 4,735,064 | 4/1988 | Fischer | 62/430 |
| 4,916,916 | 4/1990 | Fischer | 62/199 |
| 5,211,029 | 5/1993 | Uselton et al. | 62/324.5 |
| 5,255,526 | 10/1993 | Fischer | 62/59 |

*Primary Examiner*—William Doerrler
*Attorney, Agent, or Firm*—Raymond L. Greene, Esq.

[57] ABSTRACT

A multi-mode high efficiency air conditioning system for storing energy and for utilizing the stored energy is provided. The air conditioning system includes these four elements which define the entire system: a condensing unit, a dual-mode indoor cooling coil assembly, a refrigerant and air management assembly and an energy storage assembly. These four elements act in concert to perform the functions of the four principal modes of operation which are ice building, ice transfer, stage 1 cooling and stage 2 cooling. The ice building and ice transfer modes typically take place during electrical off-peak periods. The stage 1 and stage 2 cooling modes typically take place during electrical on-peak periods. When connected to an indoor air fan, the air conditioning unit provides cooling at an energy efficiency ratio (EER) of 12 or better over a 24 hour period during a 95 degree Fahrenheit day.

15 Claims, 8 Drawing Sheets

MODES OF OPERATION

| MODE ↓ / DEVICE → | REFRIG. COMPR. | REFRIG. PUMP | AIR PUMP | SOL. VALVE A | SOL. VALVE B | SOL. VALVE C | SOL. VALVE D | INDOOR FAN |
|---|---|---|---|---|---|---|---|---|
| ICE BUILD | ⊙ | | N-2 | ⊙ | | | | N-3 |
| ICE TRANSFER | ⊙ | | | ⊙ | ⊙ | | | |
| STAGE 1 COOL | ⊙ | | | | | | ⊙ | ⊙ |
| STAGE 2 COOL | N-1 | ⊙ | ⊙ | | | ⊙ | N-1 | ⊙ |

⊙ = ON OR OPEN

N-1 ENERGIZED IF STAGE 1 THERMOSTAT CONTRACTS ARE MADE
N-2 RUNS DURING SENSIBLE HEAT REMOVAL ONLY
N-3 RUNS FOR INITIAL FIVE MINUTES INTO MODE FOR REFRIG. TRANSFER. FROM INDOOR COILS

FIG. 5

MULTI-MODE HIGH EFFICIENCY AIR CONDITIONING SYSTEM

BACKGROUND OF THE INVENTION

1. Field of the Invention

This invention relates to air conditioning units and more specifically to systems providing stored energy for use during periods of peak electrical demand.

2. Description of the Related Art

Reference is made to U.S. Pat. No. 4,735,064 issued to Harry Fischer and to U.S. Pat. No. 5,255,526 issued to Harry Fischer. Both of these patents utilize ice storage to shift air conditioning loads from on-peak to off-peak electric rates to provide economic justification. A need exists not only for load shifting from on-peak to off-peak periods, but also for increases in the capacity and efficiency of a given compressor so that the combination results in an overall increase in EER or energy efficiency ratio. This increase in overall efficiency is a governmental goal that controls the Public Service Commissions' relationship with the electric utility companies. The governmental goal of reducing energy usage greatly favors nighttime use of electricity for the following reason: First, low demand during nighttime hours allows electric utility companies to use their most efficient equipment. For example, high efficiency electric generators, typically stream-driven, produce a kilowatt-hour (KWH) for approximately 8900 BTU. In contrast, a peak hour high capacity electrical generator, such as a gas turbine, can use as much as 14,000 BTU to produce the same KWH of electricity. Second, for cooling systems, operating the system at night affords a higher efficiency by lowering the temperature of the condensing unit.

SUMMARY OF THE INVENTION

An object of the invention is to provide an air conditioning system having a multi-mode operating cycle including direct cooling, ice-making, ice cooling and combination thereof.

Another object of the invention is to provide an air conditioning system having a dual mode cooling coil assembly.

Yet another object of the invention is to provide an air conditioning system having a continuously or near-continuously operating compressor.

A further object of the invention is to provide an air conditioning system having a means to reduce the peak demand electrical energy required to operate the system.

Still another object of the invention is to provide an air conditioning system having a means to reduce over all fuel consumption by the electrical utility.

Yet another object of the invention is to provide an air conditioning system that operates to air condition a building with the maximum capacity and efficiency that is possible with a given size compressor and condensing unit.

Still another object of the invention is to provide an air conditioning system that operates to air condition a building with lower humidity levels, thereby affording the occupants of said building a greater degree of comfort by improvements in indoor air quality of said building.

Accordingly, the invention is a multi-mode high-efficiency air conditioning system having two indoor cooling coils, a condensing unit, a refrigerant-air management assembly, and an energy storage assembly. The two indoor cooling coils form a dual indoor cooling coil assembly which can operate at two different operating temperatures, a "cool" operating temperature and a "cold" operating temperature.

The air conditioning system compressor must operate for extended periods in contrast to typical prior art devices. Instead of remaining off during the building periods, the compressor operates at lower evaporating temperatures to freeze ice and thus store energy for periods of greater demand. When the ice storage capacity is full, the compressor will shut off. As air conditioning is called for, the compressor operates to cool the "cool cooling coil" at an evaporator temperature that is about 55 degrees Fahrenheit. At this temperature, sensible cooling capacity is high and an EER of 16 is common.

As long as sensible cooling can keep air conditioned spaces within the comfort range, "cool cooling coil" cooling will be used because it is the most efficient. Whenever the "cool cooling coil" operates, this is also known as the "Stage 1" cooling mode. When humidity rises and the humidistat contacts close, the refrigerant pump causes low temperature refrigerant to flow to the "cold cooling coil" that operates at an evaporator temperature of about 40 degrees Fahrenheit. This low temperature refrigerant reduces the air humidity. Whenever the "cold cooling coil" operates, this is also known as the "Stage 2" cooling mode. The refrigerant vapor returning from the "cold cooling coil" melts some of the ice in storage until the humidistat is satisfied and its contact open. The ice coils are melted from the inside so that the refreezing of the ice annulus is rapid and the refreezing process occurs at the highest possible evaporator temperature.

When the demand for air conditioning exceeds the capacity of the "cool cooling coil", the "cold cooling coil" is supplied with liquid refrigerant from the refrigerant pump. The vapor from the "cold cooling coil" is condensed on the inside surface of the refrigerant coils in the ice tank. As the ice melts and the annulus of water around the coils increases, an air pump delivers air to the annulus space to increase the heat transfer rate between the ice and the tube by means of air agitation.

The compressor during a normal air condition day is operating the "cool cooling coil" at a high EER as previously discussed. During the period when the "cool cooling coil" cannot meet the cooling load, the "cold cooling coil" operates at an EER of 9.6.

With the scheme, a nominal 5 ton compressor can, during a design 95 degree Fahrenheit hot day, provide about 12 tons of total cooling during a nine hour on-peak load interval at an overall EER of about 12, including rooftop supply fan energy. During any time intervals not requiring operation of the "cold cooling coil", the overall EER will rise to about 16. The reduction in demand is about 50% of the normal demand using a conventional 12 ton rooftop system.

Within the preceding and all following text and claims, the terms "cool cooling coil", "cold cooling coil" and "dual coil" have been used. It should be clearly understood that the use of one cooling coil having dual refrigerant circuits can be used in lieu of two cooling coils. In this case, these terms reflect "cool cooling circuit", "cold cooling circuit" and "dual circuit" respectively

BRIEF DESCRIPTION OF THE DRAWINGS

The invention together with further objects and advantages thereof, may be more fully understood by reference to the following detailed description taken in conjunction with the accompanying drawings wherein:

FIG. 5 is a schematic depiction of the status of electrically-actuated devices during each mode;

DETAILED DESCRIPTION OF THE INVENTION

Figure 1:
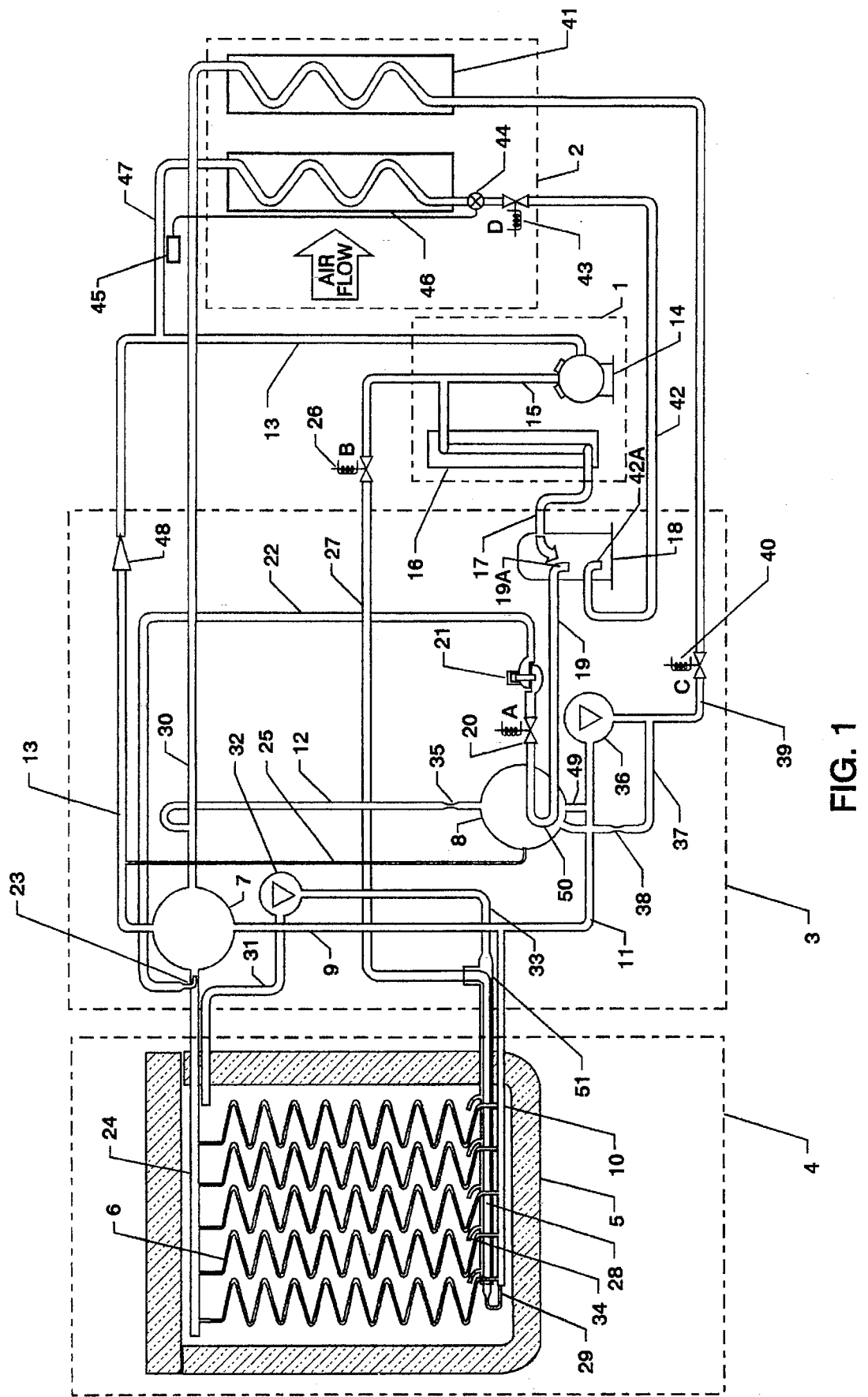
FIG. 1 is a schematic drawing of the apparatus of the subject invention with the energy storage assembly shown in cross section.

Referring now to FIG. 1, the multi-mode, high-efficiency air conditioning system is depicted with the four major components which define the system. The condensing unit 1 is a conventional condensing unit which is connected to one of two indoor cooling coils in a dual-mode indoor cooling coil assembly 2 after passing through a dual-level high pressure receiver 18. The dual-mode cooling coil assembly 2 is then connected to a refrigerant-air management assembly 3 (for refrigerant distribution and air handling) which is connected to an energy storage assembly 4 comprising an insulated tank filled with water and ice-making coils. These four elements act in concert to perform the functions of the four principal modes of operation which are shown in FIGS. 4, 5, 6, 7 and 8.

The ice storage tank 5 contains dual purpose ice freezing and ice discharging coils 6, arranged for gravity circulation and drainage of liquid refrigerant, are spaced on about 2-inch top to bottom centers and are typically fabricated from ³/₁₆ inch diameter metal tubing. Said dual-purpose ice freezing and ice discharging coils 6 are connected to an upper header, a vapor header assembly 24 at the top and to a lower header, a liquid header assembly 10 at the bottom. The vapor header assembly 24 extends outward through the ice storage tank 5 to the vapor disengaging receiver 7. This connection port functions in a dual-mode capacity in that refrigerant vapor travels from the vapor header assembly 24 into the vapor disengaging receiver 7 during the ice building operating mode and reverses direction during the ice discharging mode. A liquid downcomer line 9 is connected to the bottom of the vapor disengaging receiver 7 and runs vertically to a point where it connects to the liquid header assembly 10. From this connection point, a pump suction line 11 extends to the refrigerant pump 36. From the refrigerant pump 36, refrigerant flows either through bypass line 37 through a restrictor 38 and into the low pressure liquid refrigerant storage receiver 8, or from the refrigerant pump 36 through supply header 39 to the cold refrigerant solenoid valve 40 and into the cold cooling coil 41. (By arrangement of the physical components so that the ice storage and condensing unit are located above the cooling coils, it is possible to eliminate the refrigerant pump.) From the cold cooling coil 41, the refrigerant returns to the vapor disengaging receiver 7 through the wet refrigerant suction pipe 30. The refrigerant pump 36 is connected to the low pressure liquid refrigerant storage receiver 8 by way of a liquid refrigerant connecting pipe 49. The low pressure liquid refrigerant storage receiver 8 is also connected to the wet refrigerant suction pipe 30 by way of a vapor return line 12 and the vapor flow restrictor 35. An oil return line 25 also interconnects the low pressure liquid refrigerant storage receiver 8 to the dry refrigerant suction pipe 13. The vapor disengaging receiver 7 is connected to the compressor 14 by way of the dry refrigerant suction pipe 13 and a check valve 48.

The high pressure circuitry of the system is best understood by starting at the compressor 14. From the compressor 14, high pressure vapor travels to an air cooled. condenser 16, after passing through the compressor discharge pipe 15. The condenser 16 is then connected to the refrigerant condenser drain pipe 17 which connects to the dual-level high pressure receiver 18. From this receiver 18, refrigerant may travel in two directions. The lower-most route is explained first. Liquid refrigerant passes through lower outlet 42A of the dual-level high pressure receiver 18 into the cool cooling coil high pressure liquid supply pipe 42 to a solenoid valve 43. If this solenoid valve 43 is open, refrigerant then travels to an expansion valve 44 where it is reduced to a low pressure liquid and vapor. This mixture travels through the cool cooling coil 46 into the cool cooling coil suction pipe 47. The superheat quality of the refrigerant is controlled by the superheat bulb 45 connected to the expansion valve 44. The cool cooling coil suction pipe 47 is connected to the dry refrigerant suction pipe 13 which is, in turn, connected to the compressor 14. An outdoor fan which causes air to flow over the condenser 16 surfaces is not shown but operates simultaneously with the compressor 14.

The upper outlet pipe 19A of the dual-level high pressure receiver 18 is connected to the high pressure refrigerant makeup pipe 19 which is connected to the internal heat exchanger/oil still 50, located inside of the low pressure liquid refrigerant storage receiver 8. From this point, refrigerant travels to a solenoid valve 20 and if it is open, to a high-side float valve 21. The function of the high-side float valve 21 is similar to the expansion valve 44 in that high pressure liquid refrigerant flashes to the low-side pressure. However, the high-side float valve 21 has no device for controlling refrigerant superheat. All liquid which enters the high-side float valve 21 passes through it, however an internal mechanism prevents the passage of refrigerant vapor. As an alternative to the high side float valve 21, a subcooling expansion valve may also be used which only allows liquid to pass that has been cooled a few degrees below the condensing temperature. Refrigerant, now at the low-side pressure having passed through the high-side float valve 21 or subcooling expansion valve 21, now travels through the low pressure refrigerant make-up pipe 22 to a dual-mode port serving as both an inlet and an outlet herein referred to as a refrigerant eductor 23 mounted inside of the vapor header assembly 24.

Figure 2:
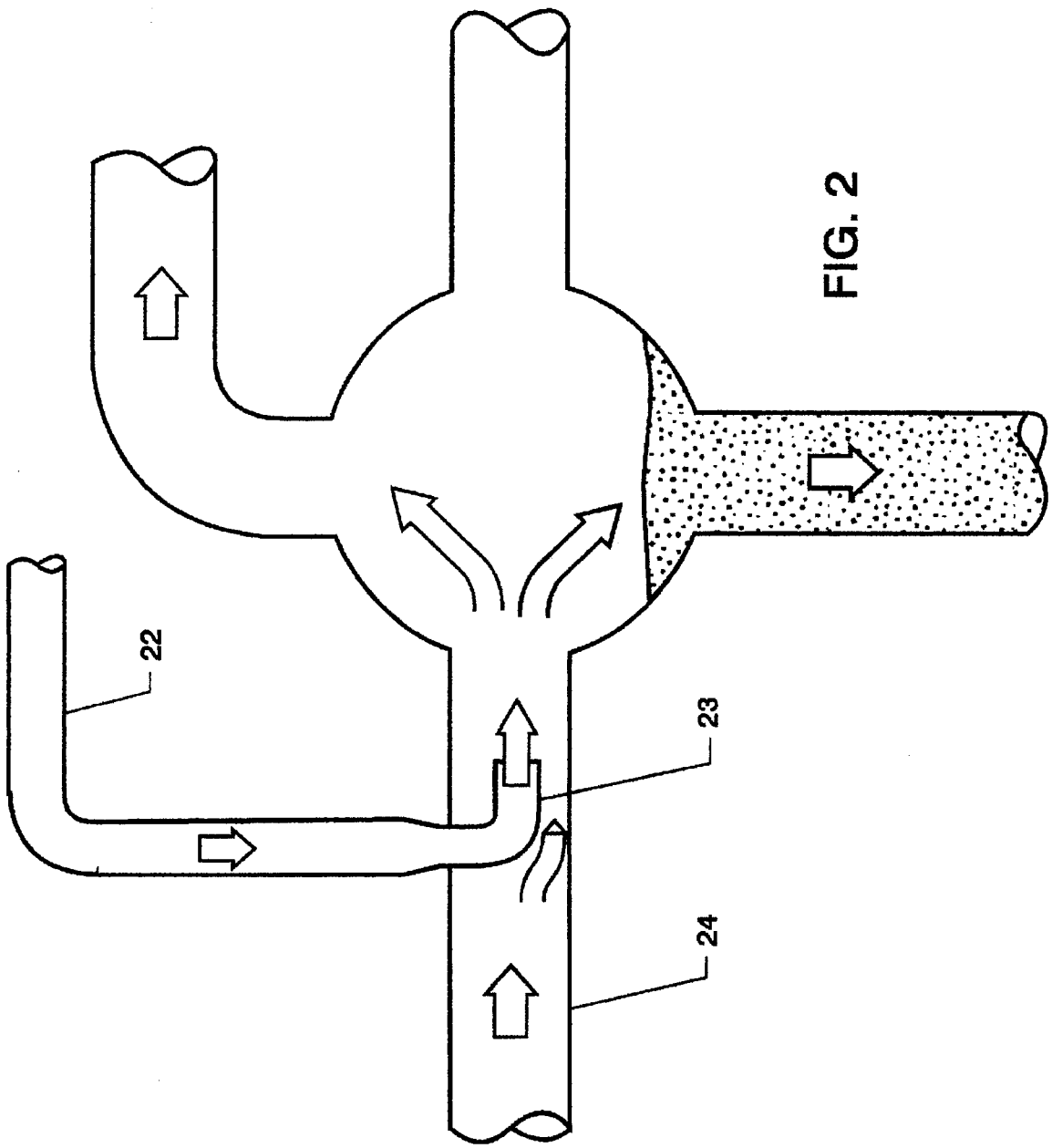
FIG. 2 is a schematic drawing with the refrigerant eductor and vapor header assembly in cross-section.

The relative position of the refrigerant eductor 23 and vapor header assembly 24 is more clearly shown in FIG. 2. The refrigerant inside the eductor 23 follows Bernoulli's Principle in that its internal energy remains constant while its velocity increases, thus reducing its internal pressure. This high velocity induces a secondary stream of refrigerant from the vapor header assembly 24, thus improving the rate of its circulation by the presence of a lower internal pressure at the point where the eductor 23 injects the primary refrigerant stream which is supplied from the low pressure refrigerant make-up pipe 22. The path taken by the two component refrigerant phases is further described hereinafter under the respective modes of operation, FIGS. 4 and 8.

Again referring to FIG. 1, high pressure superheated refrigerant vapor or hot gas may travel into the refrigerant vapor supply pipe 27 from the compressor discharge pipe 15, when solenoid valve 26 is open during the ice transfer mode. From this point, the flow path taken by the refrigerant vapor is best understood by examination of the cross-section shown in FIG. 3. The hot refrigerant vapor supply pipe 27 enters the inside of the air supply pipe assembly 51 at a point where the air supply pipe assembly 51 joins with the air pump discharge pipe 33. The combination of these two pipes with one inside the other pass into the ice storage tank 5. Once inside the ice storage tank 5, the refrigerant vapor supply pipe 27 is connected to an internal refrigerant heat exchanger assembly 28 which is installed inside of the air supply pipe assembly 51. Heat is transferred from the refrigerant vapor inside the internal refrigerant heat exchanger assembly 28 to ice surrounding the air supply pipe assembly 51 because the internal refrigerant heat exchanger assembly 28 is in physical contact with the air supply pipe assembly 51. During the heat transfer process, the hot refrigerant vapor or hot gas becomes high pressure liquid. It then travels out of the internal refrigerant heat exchanger assembly 28 into a refrigerant capillary 29 where its pressure gradually reduces as it travels the length of the capillary 29. After exiting the capillary 29, the refrigerant is at the low-side pressure. It then passes into the liquid header assembly 10.

Figure 3:
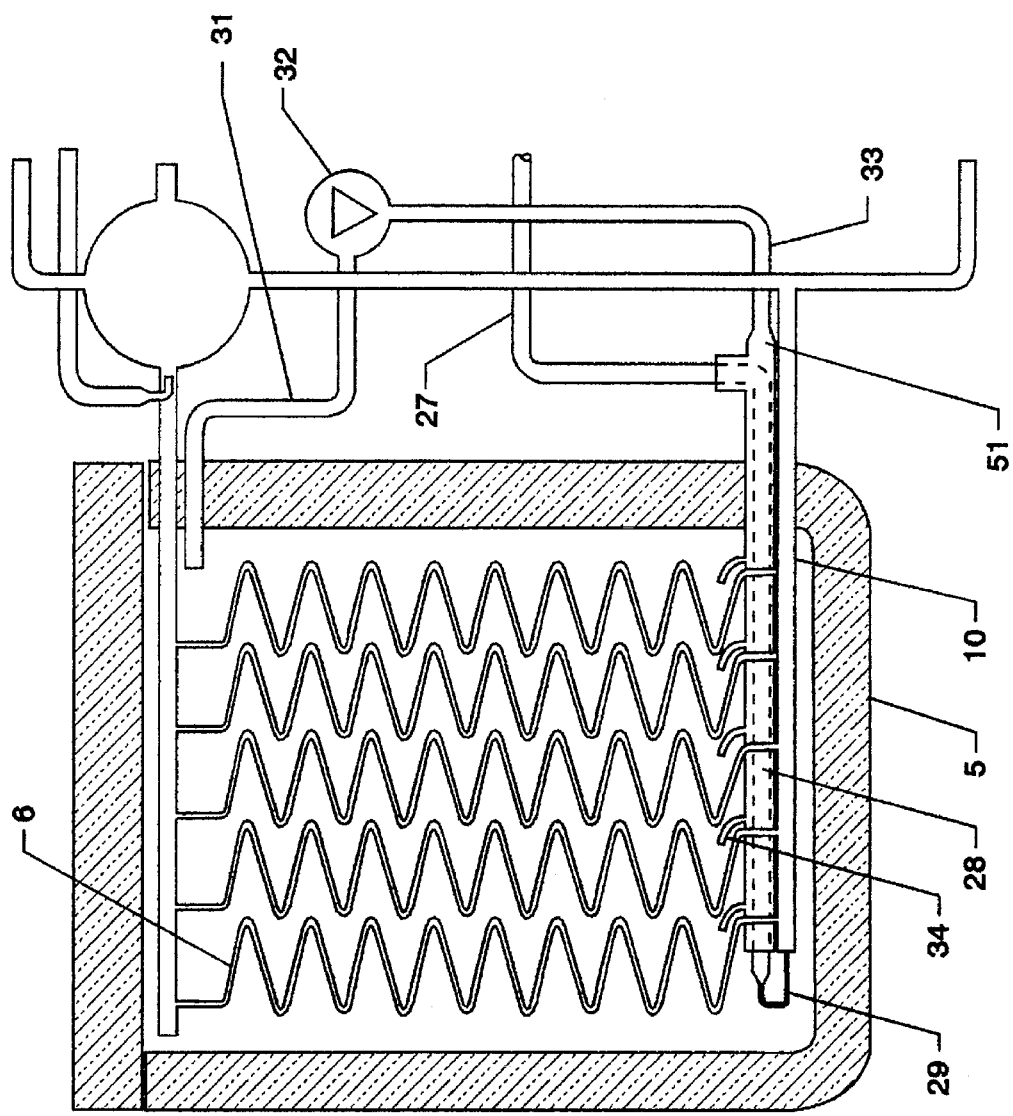
FIG. 3 is a schematic drawing with the air supply and air injector nozzle assemblies in cross-section.

Continuing in FIG. 3, the air management portion consists of an air pump 32 with its intake air pipe 31 being connected to the top of the ice storage tank 5. The air is pumped into the air pump discharge pipe 33 which is connected to the air supply pipe assembly 51. The combination of the air supply pipe assembly 51 and the internal refrigerant heat exchanger 28 jointly enter through the bottom of the ice storage tank 5. The air then enters the ice storage tank 5 and is controlled through a plurality of air injector nozzles 34 which are each connected to the air supply pipe assembly 51. When the air pump operates, minute air bubbles exit each air injector nozzle 34 and rise along side each ice freezing and ice discharging coil 6, moving with them a quantity of water. This agitation increases performance during ice discharge, otherwise known as Stage 2 cooling mode by increasing heat transfer from the surface of each ice freezing and ice discharging coil 6 to the adjacent ice interface surface. The thermal conductivity of a still water layer is poor. This air management assembly herein described provides controlled agitation of the water layer and takes heat transfer from the purely conductive into the convective regime.

Operation of the System

Figure 4:
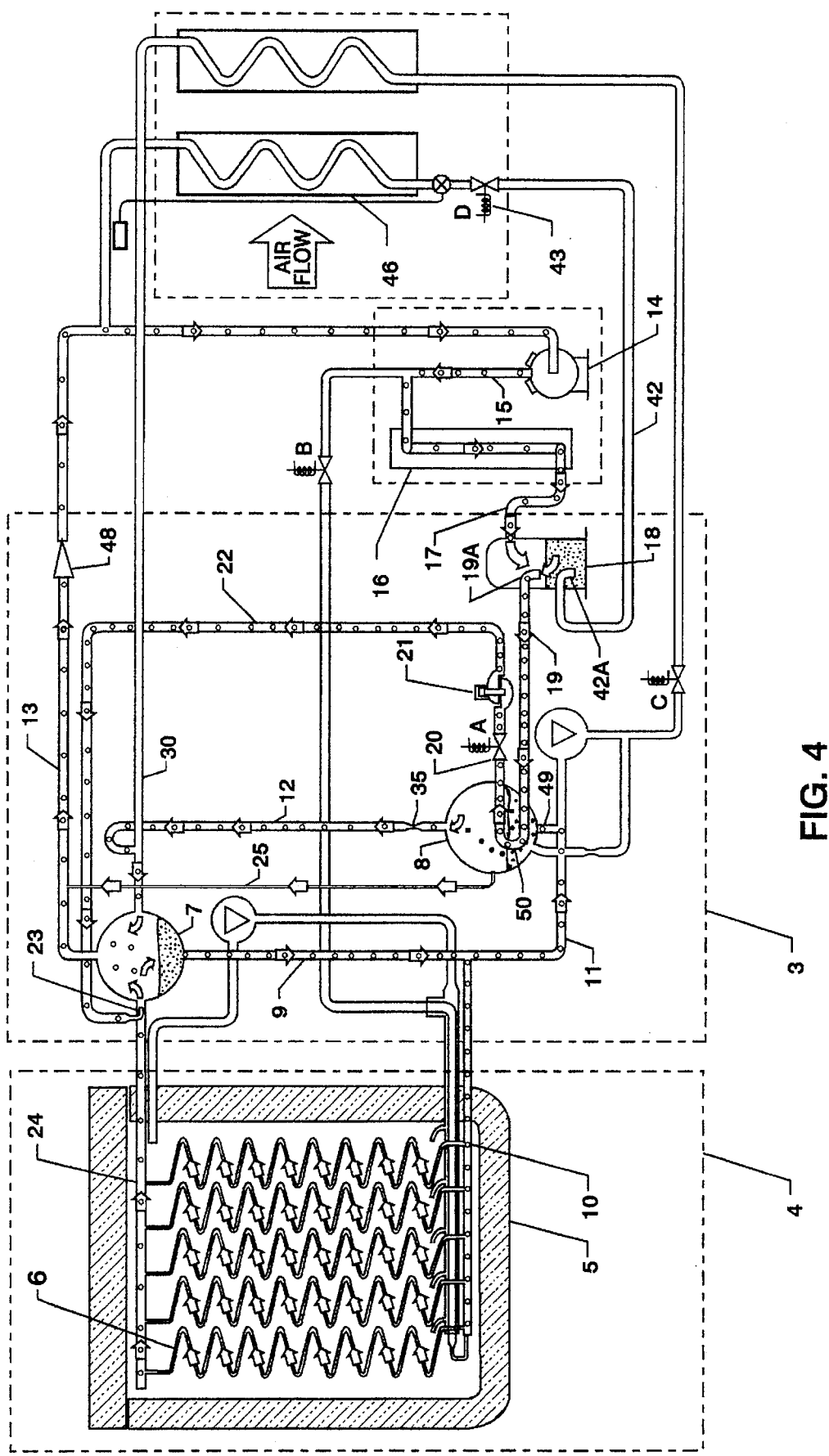
FIG. 4 is a schematic depiction of the ice building operating mode.

For further clarity, the four operating modes of the system will be described, starting with the ice build mode, depicted in FIG. 4. As an aid to further clarify this mode and all subsequent operating modes, FIG. 5 is presented which shows the position (on/off or open/closed) of all electrically-actuated devices. During the 12 hour interval normally allotted for the ice build mode each 24 hour day, the Carnot heat source for the cycle is the sensible and latent heat contained within the ice storage tank 5 and that the Carnot heat sink is the ambient or outdoor air. For purposes of this discussion, refrigerant flow will begin at the compressor 14. With the compressor running, refrigerant vapor leaves the compressor 14, travels down the compressor discharge pipe 15, and enters the condenser 16. Because the outdoor fan (not shown) which causes air to flow over the condenser 16 surfaces runs simultaneously with the compressor 14, heat is rejected to the outdoor air from the hot entering vapor, changing its phase to a liquid. The liquid travels out of the condenser 16, enters the refrigerant condenser drain pipe 17 where it is conveyed to the dual-level high pressure receiver 18. Once here, two outlet paths are possible. Only solenoid valve 20 is open, therefore the liquid refrigerant flows out into the high pressure refrigerant makeup pipe 19 after passing through outlet pipe 19A. With solenoid valve 43 closed, liquid refrigerant accumulates in the dual-level high pressure liquid receiver 18, thereby completely flooding lower outlet 42A. This liquid reserve in the high pressure liquid receiver 18 is held in reserve to meet the operating refrigerant charge of the cool cooling coil 46 during the Stage 1 cooling mode, described later. Liquid refrigerant continues to accumulate until it reaches upper outlet pipe 19A. After reaching upper outlet pipe 19A, the liquid refrigerant passes into line 19 because solenoid valve 20 open.

After traveling down line 19, the liquid refrigerant enters the internal heat exchanger/oil still 50 inside the low pressure liquid refrigerant storage receiver 8. At this point, a heat transfer, oil distillation and pressure equalization process begins as follows: the outside surface of the internal heat exchanger/oil still 50 is approximately 100½ F. while the surrounding low pressure liquid temperature averages 26½ F. The low pressure liquid in receiver 8 is supplied to receiver 8 through the pump suction header 11 and connecting pipe 49. The refrigerant flow rate in the pump suction header 11 and connecting pipe 49 exactly matches the rate of oil distillation in receiver 8 during the ice build mode. The temperature difference between the low pressure liquid and high pressure liquid begins a heat transfer process between the two medium which starts a boiling process of the cold refrigerant. The resulting bubbles of cold low pressure vapor which form rise to the surface of the liquid in the receiver 8, thereby increasing the absolute pressure within receiver 8. Three exit paths for this vapor are possible: vapor return line 12, oil line 25 and connecting pipe 49. The vapor return line 12 is connected to receiver 8 at the top of receiver 8; oil line 25 and connecting pipe 49 are both at the bottom of receiver 8. This arrangement forces the vapor out of receiver 8 and into vapor return line 12 where it passes through restrictor 35. From here the vapor travels into the wet suction line 30 then into the vapor disengaging receiver 7 where it combines with the vapor from the vapor header assembly 24. The orifice of restrictor 35 is such that it exactly balances the refrigerant mass flow out of receiver 8 with the internal refrigerant boiling rate inside of receiver 8. The boiling and distillation process taking place inside receiver 8 is less than 1% of the compressor capacity. This balance occurs when the cold liquid refrigerant just comes into contact with the bottom of the internal heat exchanger/oil still 50. Any further rise in the internal cold refrigerant liquid level creates additional boiling, thus an additional rise in the absolute pressure within receiver 8. This rise in pressure forces the liquid back out of the connecting pipe 49. While this heat transfer and pressure equalization process is taking place, the boiling process of the cold liquid refrigerant also distills the refrigerant oil contained within the cold liquid refrigerant. The oil concentration of the refrigerant inside of receiver 8 rises because the vapor created from the heat transfer process leaves any oil behind. The absolute pressure within receiver 8 is higher than the absolute pressure inside of the dry suction pipe 13 by virtue of two factors: one, the heat transfer process just discussed, and the other by virtue of the liquid density head created from the difference in elevation between the receiver 8 and receiver 7. The pressure balance between receiver 8 and receiver 7 forces the remaining oil in receiver 8 out of receiver 8 and into the oil return line 25 where it travels up to the point where it connects with the dry suction pipe 13. From here, the oil is carried back with the dry suction vapor to the compressor 14 crankcase.

Now resuming the path of high pressure liquid flow from the internal heat exchanger/oil still 50 which has now been slightly subcooled below its saturation temperature, the liquid passes through the open solenoid valve 20 and into the high-side float valve or subcooling expansion valve 21. The high-side float valve 21 is constructed with a device which permits the passage of liquid only and closes upon sensing refrigerant vapor. After passing through the high-side float valve 21, the refrigerant liquid flashes to within a few pounds pressure of the low side operating pressure. At this point, the refrigerant is approximately 90% liquid and 10% vapor by weight. This mixture travels through the low pressure refrigerant makeup pipe 22 and into the refrigerant eductor 23. The refrigerant eductor 23 is installed inside of the vapor header assembly 24 as previously described in FIG. 2. As the refrigerant mixture enters the eductor 23, its velocity increases while its pressure decreases according to Bernoulli's Principle. This high velocity mixture then passes into the vapor header assembly 24. At this point, the absolute pressure of the refrigerant in the vapor header assembly 24 upstream of the point of injection drops due to the adjacent mixture stream from the eductor 23. This drop in pressure increases the rate of refrigerant circulation in the ice freezing and ice discharging coils 6, thus improving system performance. The use of an eductor 23 to makeup refrigerant into a receiver 7 in this fashion is unique to this system in that it makes use of the kinetic energy associated with a rapidly moving vapor/liquid stream.

Once inside the vapor disengaging receiver 7, the liquid and vapor separate from one another by virtue of deceleration of the common stream. By this time, the refrigerant stream velocity has fallen to less than 100 feet per minute which is sufficiently low for the liquid component to drop out of the vapor stream by gravity. Liquid refrigerant then falls by gravity to the bottom of the vapor disengaging receiver 7. The refrigerant vapor passes out of the vapor disengaging receiver 7 through the dry suction pipe 13, then passes through the check valve 48 and continues to the compressor 14 where the vapor compression process repeats.

When the system is initially charged with refrigerant, the methodology used is by observing the level in a sight glass (not shown) on one end of the vapor disengaging receiver 7. This method becomes possible because it is known that the mass quantity of refrigerant which passes through the high-side float valve 21 will always match exactly the refrigerant boiling rate in the ice freezing and ice discharging coils 6. Therefore, it is not possible for the refrigerant level in the vapor disengaging receiver 7 to rise above its initial charge point. This charging method eliminates a refrigerant level control which is normally used with this type of gravity circulation system. Refrigerant circulation between the vapor disengaging receiver 7 and the ice freezing and ice discharging coils 6 takes place as follows: liquid refrigerant falls out of the vapor disengaging receiver 7 by gravity, down the liquid downcomer line 9 and into the liquid (lower) header assembly 10 where it is distributed to each of the ice freezing and ice discharging coils 6. Upon entering each of the ice freezing and ice discharging coils 6, the liquid refrigerant begins to boil which creates vapor bubbles. The further up the refrigerant travels inside the ice freezing and ice discharging coils 6, the more bubbles that are formed. This bubbling gives the refrigerant inside the ice freezing and ice discharging coils 6 a lower density than the liquid refrigerant inside the liquid downcomer line 9. The difference in the two respective densities is what makes the refrigerant move between the refrigerant and air management assembly 3 and the energy storage assembly 4. The operation of the air pump 32 occurs at two different parts of the total cycle. When cooling water in storage tank 5 from above freezing temperature to freezing temperature, the air pump 32 operates to improve heat transfer by increasing water flow past the ice freezing and ice discharging coil surfaces 6. After ice forms on the ice freezing and ice discharging coil surfaces 6, the air pump 32 stops. The air pump 32 again is operated when ice is being discharged. In this mode, the resulting air bubbles increase the flow of water against the surfaces of the ice freezing and ice discharging coils 6 thereby increasing the rate of heat transfer.

Figure 6:
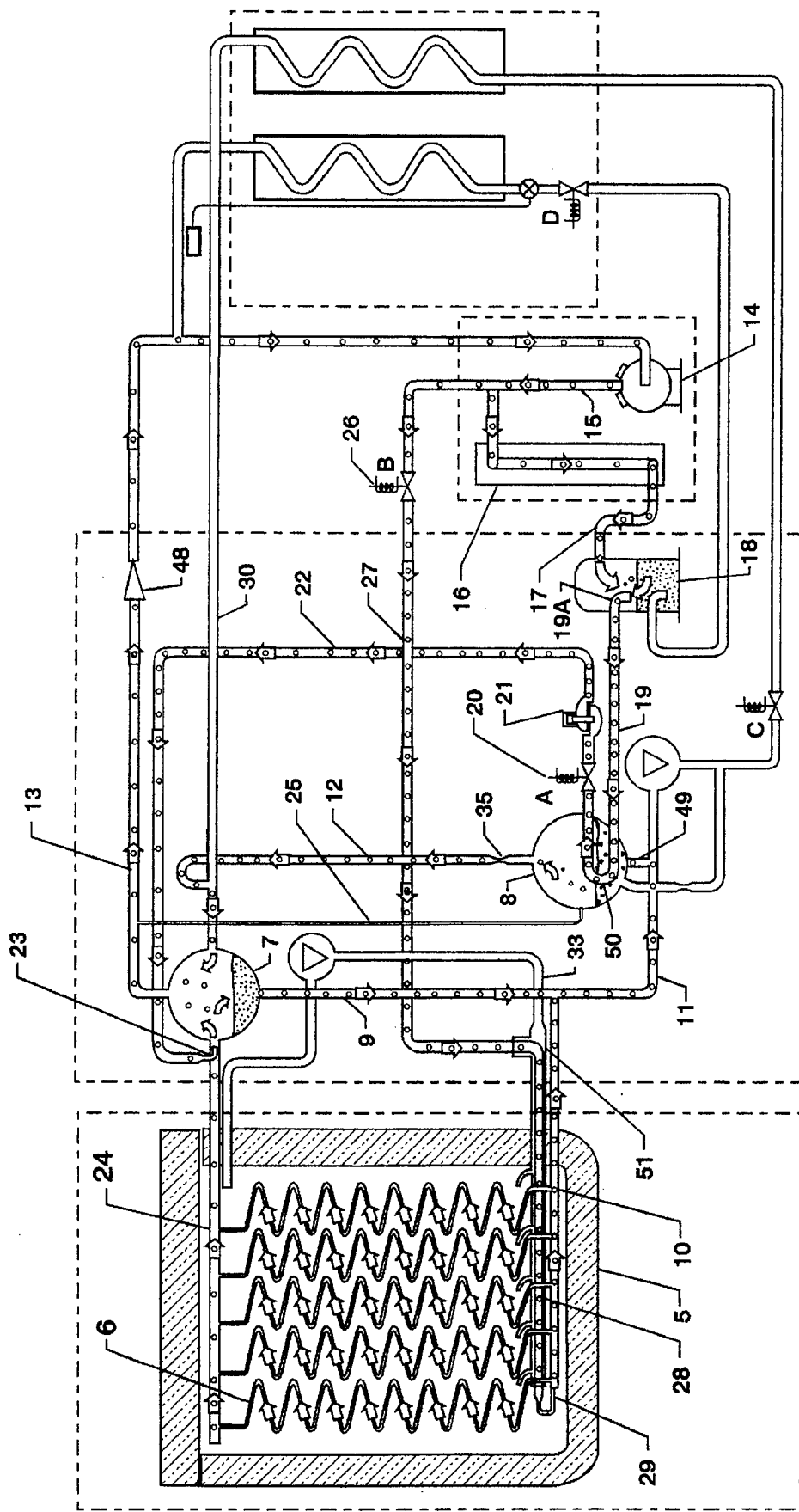
FIG. 6 is a schematic depiction of the ice transfer mode.

Operation of the system in the ice transfer mode is now shown in FIG. 6. The ice transfer mode adds one additional flow path during the last 15 minutes of the ice build mode. During this time interval it is important to note that the Carnot heat source is the remaining latent heat contained within the ice storage tank 5 and that the Carnot heat sink is both the ice storage tank 5 and the ambient or outdoor air. This movement of thermal energy from one place to another within the same boundary, the ice storage tank 5, also transfers ice from one place to another within the ice storage tank 5. This is an alternate to the more conventional use of internal electric resistance heaters which only melt ice without transferring it to another location. System operation in the ice transfer mode is identical in all respects to the previously described ice build mode shown in FIG. 4 except that the refrigerant vapor supply solenoid valve 26 is open during the ice transfer mode which adds the following description. When solenoid valve 26 is open during the ice transfer mode, high pressure refrigerant vapor travels from the compressor discharge pipe 15 into the refrigerant vapor supply pipe 27. The hot refrigerant vapor supply pipe 27 then enters the inside of the air supply pipe assembly 51 at a point where the air supply pipe assembly 51 joins with the air pump discharge pipe 33. The combination of these two pipes with one inside the other, pass into the ice storage tank 5. Once inside the ice storage tank 5, the hot refrigerant vapor supply pipe 27 is connected to an internal refrigerant heat exchanger assembly 28 which is installed inside of the air supply pipe assembly 51. Heat is transferred from the refrigerant vapor inside the internal refrigerant heat exchanger assembly 28 to ice surrounding the air supply pipe assembly 51 because the internal refrigerant heat exchanger assembly 28 is in physical contact with the air supply pipe assembly 51. During the heat transfer process, the refrigerant vapor becomes high pressure liquid. It then travels out of the internal refrigerant heat exchanger assembly 28 into a refrigerant capillary 29 where its pressure gradually reduces as it traverses the length of the capillary 29. After exiting the capillary 29, the refrigerant is at the low-side pressure. It then passes into the liquid header assembly 10. This low pressure liquid then mixes with the low pressure liquid from the vapor disengaging receiver 7 and then the mixture enters the bottom of the ice freezing and ice discharging coils 6. From here, the cycle is identical to the ice build mode. During the heat transfer process just described, ice inside the ice storage tank 5 which is adjacent to the air pump discharge pipe assembly 51 melts forming an annulus of water. This water is then available for circulation around the ice freezing and ice discharging coils 6 during the stage 2 cooling mode.

Figure 7:
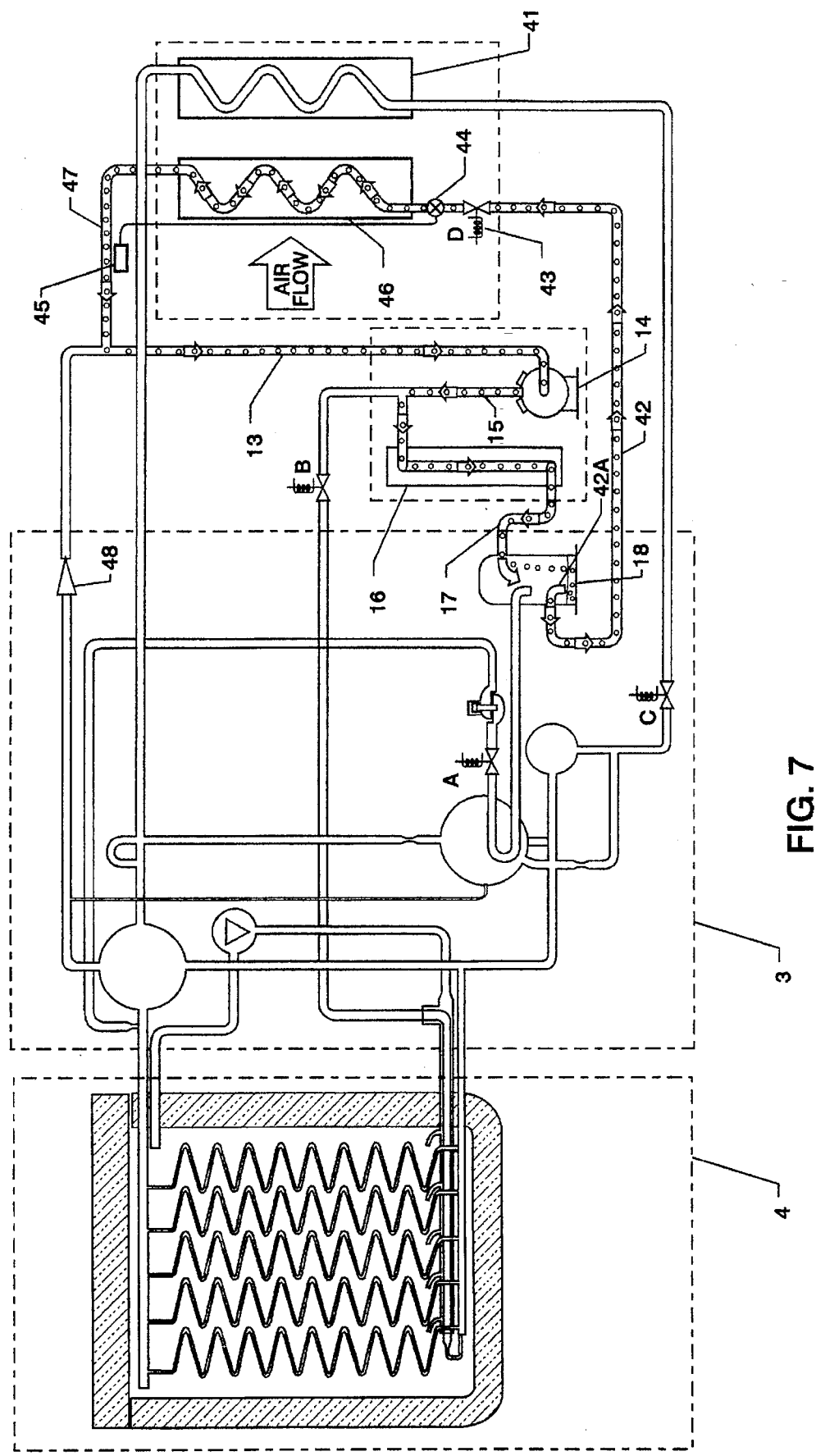
FIG. 7 is a schematic depiction of the stage 1 cooling mode.

Referring now to FIG. 7, the stage 1 cooling mode will be explained. The stage 1 cooling mode is normally initiated by the stage 1 contacts of a two stage thermostat which is not shown. The system operation during the stage 1 cooling mode is similar to a standard direct expansion cooling system except that the cool cooling coil 46 is provided with additional heat transfer surface. This is done so that the refrigerant evaporating pressure inside cooling coil 46 occurs at a higher temperature, approximately 55 degrees which is about 15 degrees higher than a standard direct expansion cooling system cycle process. It is for this reason that the cool cooling coil 46 has been so named. The heat transfer process between the refrigerant inside the cool cooling coil 46 and the air flowing over the cool cooling coil 46 surfaces is mostly sensible with little to no latent heat being removed from the entering air stream by cooling coil 46. This heat transfer process results in a much higher operating efficiency for the compressor because the compressor 14 suction pressure is at or slightly below the refrigerant pressure inside cool cooling coil 46. Operation of the cool cooling coil 46 during stage 1 cooling typically results in an EER of 16 during a 95 degree Fahrenheit hot day. The latent heat is removed from the air stream by the second cooling coil 41 whenever there is a call for stage 2 cooling.

The actual refrigerant flow path may be clearly understood by again looking at FIG. 7. Starting at compressor 14, high pressure refrigerant vapor leaves the compressor 14, and enters the condenser 16 after traveling through the discharge line 15. Once inside the condenser 16, heat is removed from the refrigerant vapor by the outdoor air stream which is flowing over the condenser 16 surfaces. Refrigerant leaves the condenser 16 in a high pressure liquid state and enters the dual-level high pressure liquid receiver 18 after passing through the condenser drain line 17. The only solenoid valve open during this mode is solenoid valve 43 so the liquid refrigerant passes out of the dual-level high pressure receiver 18, through outlet 42A and into pipe 42 where it flows to the solenoid valve 43. Because solenoid valve 43 is open, the liquid refrigerant enters the expansion valve 44 where it flashes to the low side pressure. The resulting liquid and vapor mixture enters the cooling coil 46 and is converted to all vapor by the warm air stream passing over the surfaces of the cooling coil 46. The exiting refrigerant quality is controlled by the superheat bulb 45. After passing through the cooling coil suction line 47, the refrigerant vapor enters the dry refrigerant suction pipe 13. The check valve 48 prevents refrigerant from flowing backwards into the refrigerant and air management assembly 3 and the energy storage assembly 4. After the refrigerant enters the dry refrigerant suction pipe 13, it travels back to the compressor 14. From here the process repeats.

Figure 8:
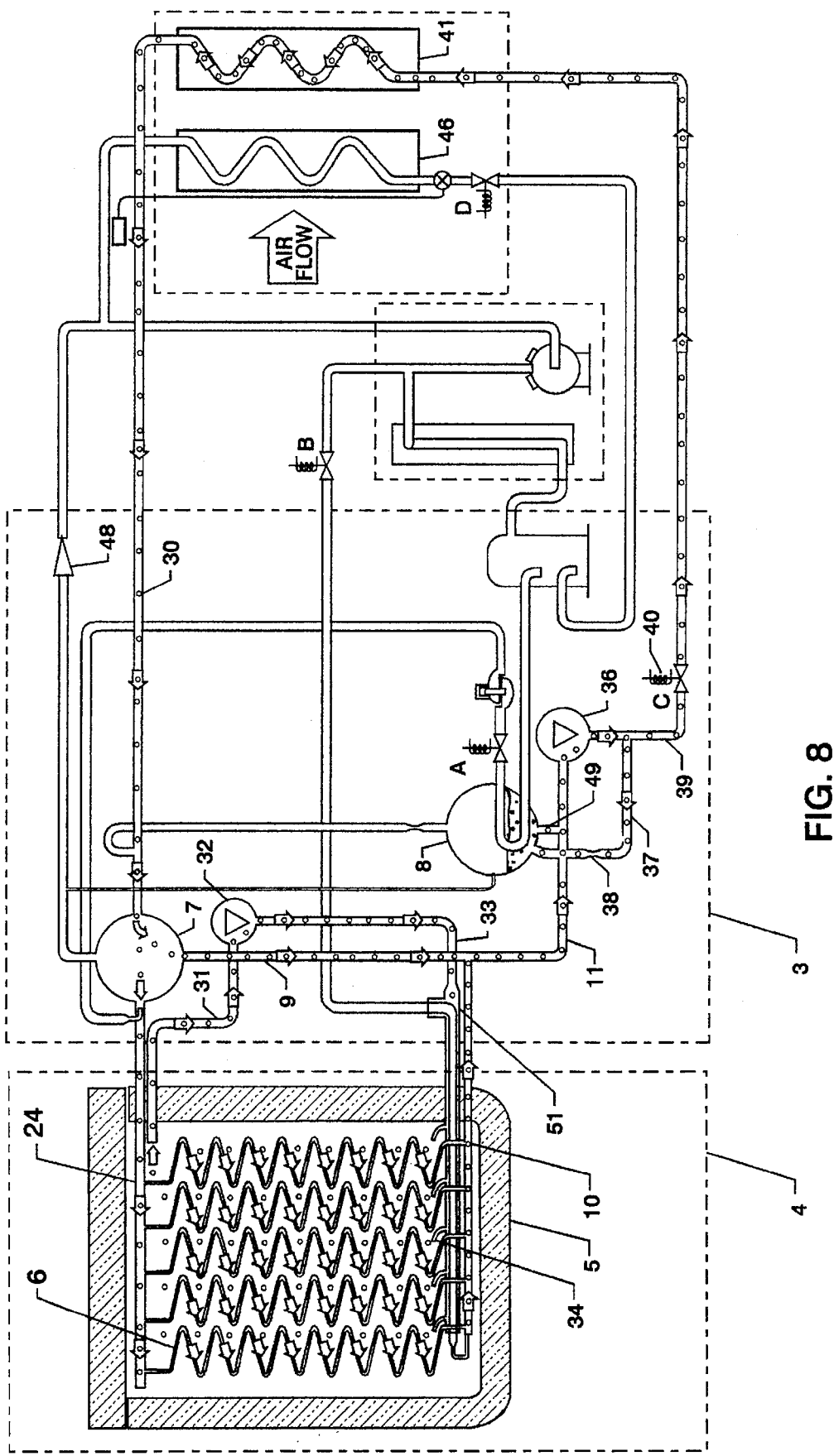
FIG. 8 is a schematic depiction of the stage 2 cooling mode.

The stage 2 cooling mode is now presented in detail by examination of FIG. 8. Stage 2 cooling mode can either be initiated by a humidistat or by the second stage of a two stage thermostat. In the description which follows, a two stage thermostat has been assumed. It should be understood that if the two stage thermostat, (which is not shown) calls for stage 1 cooling, that stage 1 cooling can run simultaneously with the stage 2 cooling mode, in which case the description of FIG. 7 would be taken with the description which now follows. Immediately following the cessation of the ice transfer mode, all refrigerant liquid in both the refrigerant and air management assembly 3 and the energy storage assembly 4 drains by gravity into the low pressure liquid refrigerant storage receiver 8. From the low pressure liquid refrigerant storage receiver 8, the refrigerant falls by gravity to the inlet of the refrigerant pump 36 after passing out of the connecting pipe 49 and through the pump suction line 11. When the refrigerant pump 36 starts upon a call for stage 2 cooling, refrigerant passes into the supply header 39. From here it has two paths. The first path is through the bypass line 37 and through the cooling load-limiting restrictor 38 back into the low pressure liquid refrigerant storage receiver 8. The cooling load-limiter 38 is set to pass any refrigerant not required in order to meet the peak design cooling load of the cold cooling coil 41. For example, if the design peak cooling load of the cold cooling coil 41 is 5 tons, the refrigerant flow rate to meet this cooling load would be 11.5 pounds per minute. This mass flow then equals 1.09 gallons per minute at 40 degrees F., using refrigerant HCFC-22 as the example. If the refrigerant pump 36 has the capability of pumping 2.0 gallons per minute, the bypass restrictor 38 would be set for the difference between the two, or 0.91 gallons per minute. This feature limits the peak cooling rate of the cold cooling coil to the boiling rate of 1.09 gallons per minute flow to the cooling coil 41. This is important in thermal storage applications because there are many hours when the design cooling load can be exceeded by such phenomena as doors to the out-of doors left open when the establishment using the apparatus gets very busy. Failure to account for this phenomena will prematurely discharge the ice in the storage tank 5.

The other path that the refrigerant will take upon leaving the pump 36 is through the solenoid valve 40 which is open and on to the cold cooling coil 41. This cooling coil 41 is called cold because of the temperature of the refrigerant within its heat transfer tubing can vary between 36 degrees Fahrenheit and 44 degrees Fahrenheit depending on the required total cooling load to be met. As refrigerant enters this cooling coil 41 it encounters the moderately cooled air of about 65 degrees Fahrenheit which leaves the cool cooling coil 46 which is normally in operation when the cold cooling coil 41 is active. This 65 degree Fahrenheit air causes heat transfer within cold cooling coil 41 to further cool and dehumidify the air passing over it. When the refrigerant leaves the cold cooling coil 41, it may have some amount of liquid left as a part of its composition. This quality is not controlled. If liquid is left in the refrigerant, it is called a two-phase mixture. The refrigerant then passes down the wet suction line 30 and enters the vapor disengaging receiver 7. Upon entering the vapor disengaging receiver 7, the velocity of the returning refrigerant falls below 100 feet per minute and the liquid, if any is present, falls by gravity to the bottom of the disengaging receiver 7. The liquid then falls by gravity down the downcomer line 9 and into the pump suction line 11 and returns to the pump 36 for recirculation. If sufficient liquid refrigerant exists at this point in time to meet the requirements of pump 36, the liquid then backs up the connecting pipe 49 and enters the low pressure liquid refrigerant storage receiver 8 where the liquid is available for use by the pump 36.

Vapor refrigerant entering the vapor disengaging receiver 7 passes immediately into the upper vapor header assembly 24 because of the low pressures created in the ice freezing and ice discharging coils 6 by the adjacent ice. This vapor seeks out the entrance of each of the plurality of ice freezing and ice discharging coils 6. After entering the ice freezing and ice discharging coils 6, it begins to condense back into the liquid phase. As the refrigerant condenses, it falls by gravity down each ice freezing and ice discharging coil 6. The resulting liquid refrigerant then falls into the lower liquid header assembly 10, then drains out into the pump suction line 11, then returns to the refrigerant pump 36 for recirculation.

Operation of the air pump 32 begins whenever the refrigerant pump 36 operation is initiated. The description which follows is best understood by referring to FIG. 3 (previously described). Air is drawn off the top of the ice mass within the ice storage tank 5 and enters the air pump 32 after passing through line 31. From the air pump 32, the air travels through the pump discharge line 33 and enters the air supply pipe assembly 51. The air inside the air supply pipe assembly 51 enters the ice storage tank 5 and travels to each of the plurality of air discharge nozzles 34. Minute air bubbles exit each of the air discharge nozzles 34 and travel up each ice freezing and ice discharging coil 6 which moves water along with the bubble stream. The previous heat transfer with the warm refrigerant vapor during the ice transfer mode makes possible the movement of the stream of air bubbles and water adjacent each ice freezing and ice discharging coil 6. This water and air stream is very important because this movement is an improvement upon previous methods of attaining heat transfer in an inside-melt ice thermal storage system. The present invention requires no refrigerant pump out mode or hypermigration mode in order to operate.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A multi-mode high efficiency air conditioning system comprising:
    a) a condensing unit;
    b) a refrigerant distribution system connected to said condensing unit;
    c) an insulated tank filled with water and containing coils therein, said coils being connected to the refrigerant distribution system; and
    d) a dual-mode cooling coil assembly comprising a cool upstream and a cold downstream coil attached to the refrigerant distribution system.

2. A multi-mode high efficiency air conditioning system as in claim 1 wherein said condensing unit comprises a compressor.

3. A multi-mode high efficiency air conditioning system as in claim 2 wherein said condensing unit further utilizes an air-cooled condenser attached to said compressor.

4. A multi-mode high efficiency air conditioning system as in claim 1 wherein said refrigerant distribution system comprises a dual-level high pressure receiver connected said condensing unit, having an upper outlet and a lower outlet.

5. A multi-mode high efficiency air conditioning system as in claim 4 wherein said refrigerant distribution system further comprises a low-pressure liquid refrigerant storage receiver containing a heat exchanger connected to the upper outlet of said dual-level high pressure receiver, said storage receiver having an outlet high pressure liquid refrigerant make up line, a vapor line and an oil return line attached thereto.

6. A multi-mode high efficiency air conditioning system as in claim 5 wherein said refrigerant distribution system comprises a refrigerant pump also connected to the low pressure refrigerant storage receiver.

7. A multi-mode high efficiency air conditioning system as in claim 5 wherein said refrigerant distribution system further comprises a high-side float valve connected to said outlet high pressure liquid refrigerant line from said heat exchanger contained within said low pressure liquid refrigerant storage receiver.

8. A multi-mode high efficiency air conditioning system as in claim 7 wherein said refrigerant distribution system comprises a vapor disengaging receiver connected to the high-side float valve, said disengaging receiver having a lower outlet for liquid discharge, an upper outlet for vapor returning to said condensing unit, and an inlet for receiving mixtures of liquid and vapor refrigerant from said high-side float valve, and a dual-mode port serving as both inlet and outlet.

9. A multi-mode high efficiency air conditioning system as in claim 1 wherein said insulated tank contains a plurality of small diameter (ice freezing and ice discharging) helical coils connected to a lower header and to an upper header and further comprises a hot-vapor line connected to said condensing unit and providing hot refrigerant vapor to the lower manifold in said insulated tank thereby providing a means for melting ice immediately adjacent to the coil inlets while ice is simultaneously being built on the helical coils within said insulated tank.

10. A multi-mode high efficiency air-conditioning system as in claim 1 wherein said dual-mode indoor cooling coil assembly comprises an upstream cool cooling coil and a downstream cold cooling coil.

11. A multi-mode high efficiency air conditioning system as in claim 10 wherein a refrigerant pump is connected to the inlet line of said cold cooling coil.

12. A multi-mode high efficiency air conditioning system as in claim 10 wherein said cool cooling coil inlet is connected to the lower outlet of the dual-level high pressure receiver.

13. A multi-mode high efficiency air conditioning system as in claim 1 wherein said insulated tank assembly further comprises an air pump having an inlet at the upper end of the insulated tank and an outlet at the lower end of the insulated tank and a hot vapor ice melting system connected to the lower manifold of said ice making and ice discharging coils and further connected to said condensing unit.

14. A multi-mode high efficiency air conditioning system comprising:
    a) an air handling unit having a cool cooling coil and a cold cooling coil downstream in the airflow from the cool cooling coil;
    b) means for supplying refrigerant to said cooling coils;
    c) means for storing refrigerant connected to said supplying means; and
    d) means for supplying refrigerant to the refrigerant storing means.

15. A multi-mode high efficiency air conditioning system comprising:
    a) a compressor;
    b) a condenser connected to said compressor;
    c) a dual-level high pressure receiver connected to said condenser;
    d) a low pressure liquid refrigerant storage receiver connected to said dual-level high pressure receiver;
    e) a refrigerant pump connected to said low pressure liquid refrigerant storage receiver;
    f) a low temperature cold cooling coil connected to said refrigerant pump;
    g) a moderate temperature cool cooling coil connected to the dual-level high pressure receiver;
    h) an ice storage tank having internally mounted ice-making and ice discharging coils, said coils having upper and lower manifolds, the lower manifold being connected to said refrigerant pump;
    i) a vapor disengaging receiver connected to the upper manifold of said ice-making and ice discharging coils and further connected to said low pressure liquid refrigerant storage receiver;
    j) a hot vapor ice melting system connected to the lower manifold of said ice making and ice discharging coils; and further connected to said compressor; and
    k) an air pump connected to and providing agitation air to the lower section of said ice storage tank.

* * * * *